United States Patent [19]

Hawk et al.

[11] 4,245,503
[45] Jan. 20, 1981

[54] THERMAL FLOWMETER

[75] Inventors: Charles E. Hawk, Newport News; Danny K. Livingston, Hampton, both of Va.

[73] Assignee: Teledyne, Inc., Los Angeles, Calif.

[21] Appl. No.: 69,267

[22] Filed: Aug. 23, 1979

[51] Int. Cl.³ .............................................. G01F 1/68
[52] U.S. Cl. .................................................... 73/204
[58] Field of Search ........................................ 73/204

[56] References Cited

U.S. PATENT DOCUMENTS

| 2,594,618 | 4/1952 | Booth, Jr. | 73/204 |
| 2,896,452 | 7/1959 | Cogniat et al. | 73/204 |
| 3,181,357 | 5/1965 | Benson | 73/204 |
| 3,246,523 | 4/1966 | Richard | 73/204 |

Primary Examiner—Herbert Goldstein
Attorney, Agent, or Firm—Cushman, Darby & Cushman

[57] ABSTRACT

A length of conduit is coupled at its ends to a heat sink. A pair of thermocouples are joined to the conduit at spaced points intermediate the ends of the conduit. A conductive post is connected at one of its ends to the heat sink and its other end is joined to a location on the conduit, midway between the thermocouples, by conductive material having a higher electrical resistance than both of the joined elements. A coil arrangement is associated with the post and is energized to cause heating current to pass through the post, the high resistance conductive material and the conduit. The heat generated by the flow of heating current is concentrated at the midpoint between the thermocouples. The thermocouples produce outputs representative of the flow of fluid through the conduit.

5 Claims, 8 Drawing Figures

THERMAL FLOWMETER

BACKGROUND OF THE INVENTION

Thermal flowmeters of the type wherein fluid passes through a length of heated conduit and the temperature of one or more points along the conduit is detected to determine flow rate are well known. Examples of such flowmeters are those disclosed in U.S. Pat. Nos. 3,181,357 and 3,229,522 granted to James M. Benson on May 4, 1965 and Jan. 18, 1966, respectively.

In the aforesaid patents, the conduit is directly heated by induced currents. Other types of heated conduit flowmeters employ an insulated heater wire wrapped around the conduit to impart heat thereto.

With respect to known arrangements, stable long term heating of the conduit is achieved. However, the curve plotting temperature gradients along the conduit tends to be flat and AC noise arising from the heating operation is picked up by the thermocouple sensors. This latter deficiency is particularly found in the arrangements of the type disclosed in U.S. Pat. Nos. 3,181,357 and 3,229,522, inasmuch as the heating current at the respective sensors is out of phase. Both the flatness of the temperature gradients and the generated AC noise adversely affect the sensitivity of the thermocouple outputs thereby limiting the accuracy of the flow detection.

In the case of systems using an insulated wire heater to heat the conduit, even though the curve of temperature gradients is less flat than in the case of induced current heating, long term stability is not available due to changes in the characteristics of the insulating material.

SUMMARY OF THE INVENTION

The present invention overcomes the deficiencies of previously known arrangements which directly heat the conduit through which the fluid being measured flows. More particularly, according to the invention, the conduit is both directly and indirectly heated. The conduit is joined at its ends to an electrically and thermally conductive heat sink. One end of a length of a conductive post is joined to the heat sink, and the other end is joined to the conduit midway between a pair of thermocouples spaced along the conduit. The joinder of the post and the conduit is formed by a conductive material having a higher electrical resistance than both of the joined elements. Means are provided for passing heating current through the post. This current in turn passes through the high resistance conductive material and the conduit. Consequently, the conduit is indirectly heated by conduction of heat from the post and the high resistance material, and it is directly heated by current flow through the conduit itself. The high resistance material concentrates the heating of the conduit at a location midway between the thermocouples. The result is that the temperatures of the conduit measured along its length sharply change in the vicinity of said location. Additionally, due to the fact that the heating currents through the conduit are distributed from the location midway between the thermocouples to the conduit portions on opposite sides of said location, the separate currents are in phase whereby negligible AC noise is produced in the thermocouples.

DETAILS OF THE INVENTION

Illustrative embodiments of the invention now will be described with reference to the accompanying drawings wherein.

Figure 1:
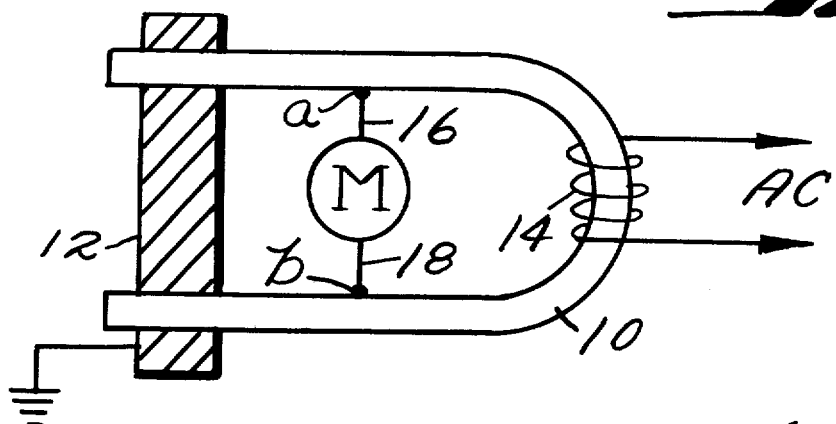
FIG. 1 shows a form of prior art apparatus of background interest to the present invention.

For purposes of background information, a previously known type of heated conduit flowmeter is shown in FIG. 1. This flowmeter is the subject of the aforesaid U.S. Pat. No. 3,181,357.

A length of conduit 10 of electrically and thermally conductive material is formed in a loop and is thermally and electrically coupled at its ends to a heat sink 12. By way of definition, a heat sink as referred to herein is a body of material of such mass that its temperature remains substantially at the ambient temperature of its surroundings, and is not influenced by heating current being passed through it and the conduit. The conduit is of lesser mass and is heated above its ambient surroundings by passage of electrical heating current therethrough.

Continuing to refer to FIG. 1, a winding 14 is wound about the conduit 10 at the central portion of the loop. The winding is energized by alternating current, preferably at high frequency, e.g., in excess of 1,000 hertz. In accordance with the laws of electromagnetic action, the current in winding 14 induces heating currents in the conduit. The temperature of points a and b along the conduit is sensed by joining to these points wires 16 and 18 of a material dissimilar to the metal of the conduit 10. For example, the conduit may be formed of copper and the wires of Constantan. Such an arrangement of dissimilar materials provides thermocouples at points a and b which respond to the temperatures at the respective junctions to produce electrical outputs having values directly related to the temperatures sensed. The wires 16 and 18 are joined through a meter M which displays the difference between the temperatures at junctions a and b. This temperature difference serves as an indication of the flow of fluid through the conduit.

Figure 2:
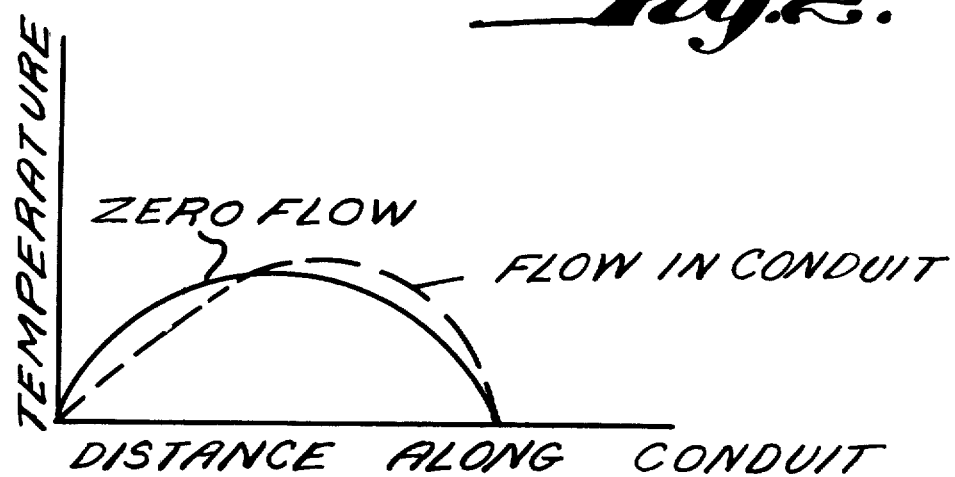
FIG. 2 shows temperature versus conduit length curves obtained in heated conduit flowmeters of the type illustrated in FIG. 1.

FIG. 2 shows a plot of the temperature gradient along the conduit shown in FIG. 1 for different conditions of fluid flow. The solid line curve shows a typical temperature gradient for zero fluid flow, while the dash lines show a typical curve of temperature gradient for flow of fluid through the conduit. As depicted in FIG. 2, when the flow builds up from zero, the temperature along the upstream half of the conduit decreases, while that in the downstream half increases. This permits thermocouples located equidistant from the midpoint of the conduit to detect different temperatures whereby a measurement of fluid flow is obtained.

As can be appreciated from FIG. 2, the curves representing temperature gradients along the conduit are relatively flat. By contrast, in accordance with the present invention, the gradients are substantially steeper whereby changes in fluid flow produce more marked temperature differentials at the thermcouple junctions, thereby increasing the accuracy of the flowmeter.

Figure 3:
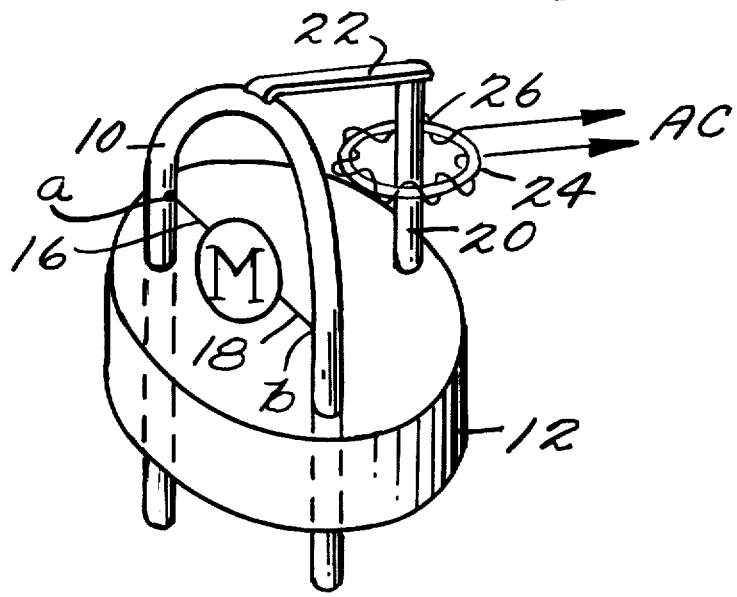
FIG. 3 shows a first embodiment of the present invention.

Referring now to FIG. 3, a preferred embodiment of the invention will be described. The structure depicted is similar to that of FIG. 1 except that the manner of heating conduit 10 has been changed. More particularly, the winding 14 has been eliminated in favor of an arrangement which includes an electrically conductive post 20 secured at one of its ends to the heat sink 12 and having its opposite end joined to the conduit 10 by a length of conductive material 22 having an electrical resistance greater than that of the post and the conduit. The material 22 is secured to the conduit at a location midway between the thermocouples located at points a and b. A toroid 24 having a winding 26 associated therewith surrounds post 20, whereby upon energization of the coil from an AC source, current is induced which includes post 20, the conductive material 22, conduit 10 and the heat sink. Since the material 22 is joined to conduit 10 intermediate its ends and midway between the thermocouples located at points a and b, the heating current is distributed between the portions of the conduit on opposite sides of the junction with material 22, and with respect to points a and b, the currents passing through the conduit portions are in phase.

Figure 4:
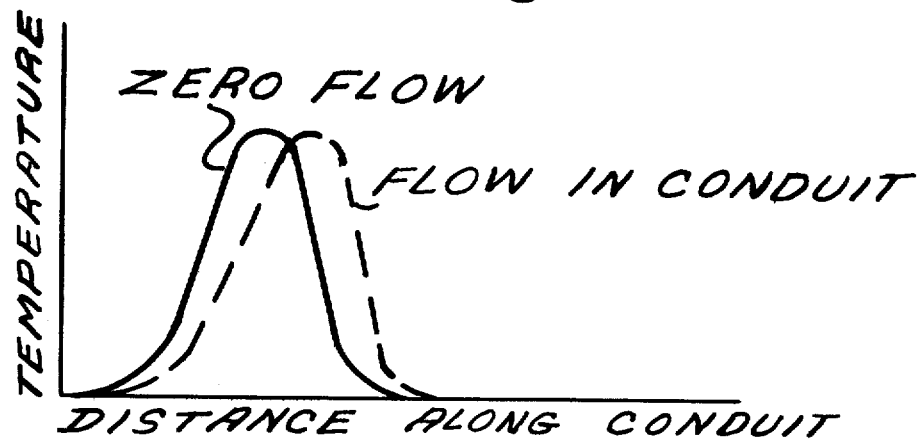
FIG. 4 shows temperature versus conduit length curves obtained with a flowmeter of the type shown in FIG. 3.

Utilizing a structural arrangement as just described, the conduit is indirectly heated by current passing through post 20 and the conductive material 22 and is directly heated by current in the conduit itself. By employing the high resistance material 22, the heat generated in the conduit is concentrated at the location midway between points a and b whereby the curve of temperature gradients along the conduit displays steep portions in its bell-shaped configuration (see FIG. 4). Consequently, by appropriate distancing of points a and b on opposite sides of the junction between the high resistance material 22 and conduit 10, a flowmeter of improved sensitivity and accuracy is obtained with reduced power requirements.

Figure 5A:
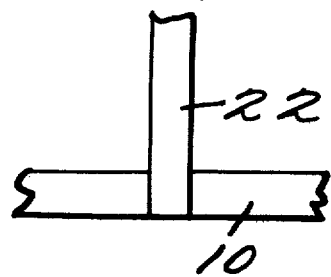
FIGS. 5a-5d show various types of junctions which may be utilized in accordance with the embodiment of FIG. 3 to connect the length of conductive material to the conduit.
Figure 5B:
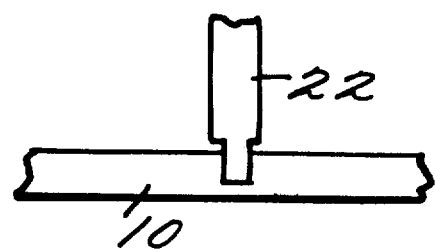
Figure 5C:
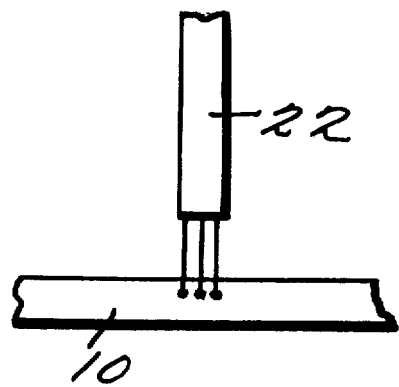
Figure 5D:
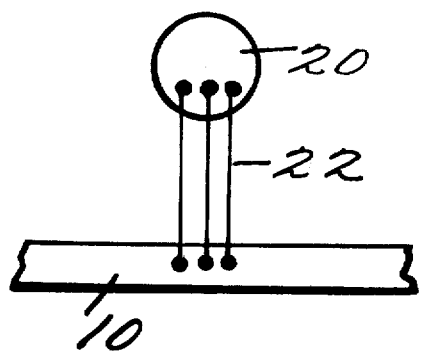

A still further advantage is that the installation of the toroid 24 and winding 26 can be accomplished after the conduit 10 and post 20 have been brazed or welded to the heat sink 12. Consequently, they are not exposed to the deleterious effects of such operations as are the arrangements made in accordance with the aforesaid U.S. Pat. Nos. 3,181,357 and 3,229,522. In order to increase the resistance of the material 22 adjacent to its point of attachment with the conduit 10, a variety of configurations are possible, as shown in FIGS. 5a-d. One or more foil bands of uniform thickness and width having a greater resistance than post 20 and conduit 10 may be employed (FIG. 5a); the foil(s) may be formed with a constriction where it joins the conduit (FIG. 5b); a combination of foil(s) and wires may be used with the wires engaging the conduit (FIG. 5c); or the foil(s) may be replaced by one or more wires extending from the post 20 to the conduit (FIG. 5d). Such arrangements permit the curves of the temperature gradients to be varied, thereby altering the signal level of the thermocouple outputs and permitting lower operating temperature and/or a reduction in the power required to heat the conduit.

What is claimed is:

1. A fluid flowmeter comprising:
   a segment of electrically and thermally conductive conduit adapted to permit a flow of fluid therethrough, said conduit having ends coupled to a heat sink;
   a pair of thermoelectric sensors operatively associated with said conduit at spaced points along the segment;
   a length of thermally and electrically conductive material extending between said heat sink and a location on said conduit substantially midway between said spaced points, a portion of said conductive material which engages the conduit having a higher electrical resistance than the remainder of said material and said conduit; and
   means for generating heating current passing through said conductive material and the conduit whereby heat is concentrated at said conduit location.

2. A fluid flowmeter as set forth in claim 1, wherein said length of conductive material includes a post joined at one of its ends to the heat sink, said portion of conductive material comprising at least one foil band of uniform width extending between the other end of the post and said conduit location.

3. A fluid flowmeter as set forth in claim 1, wherein said length of conductive material includes a post joined at one of its ends to the heat sink, said portion of conductive material comprising at least one foil band having a constricted crosssection, said band extending between the other end of the post and said conduit location with the constricted cross-section engaging said location.

4. A fluid flowmeter as set forth in claim 1, wherein said length of conductive material includes a post joined at one of its ends to the heat sink, said portion of conductive material comprising at least one wire extending between the other end of the post and said conduit location.

5. A fluid flowmeter as set forth in claim 1, wherein said means for generating heating current comprises an arrangement surrounding the conductive material and adapted to induce current therein.

* * * * *